Patented Jan. 2, 1951

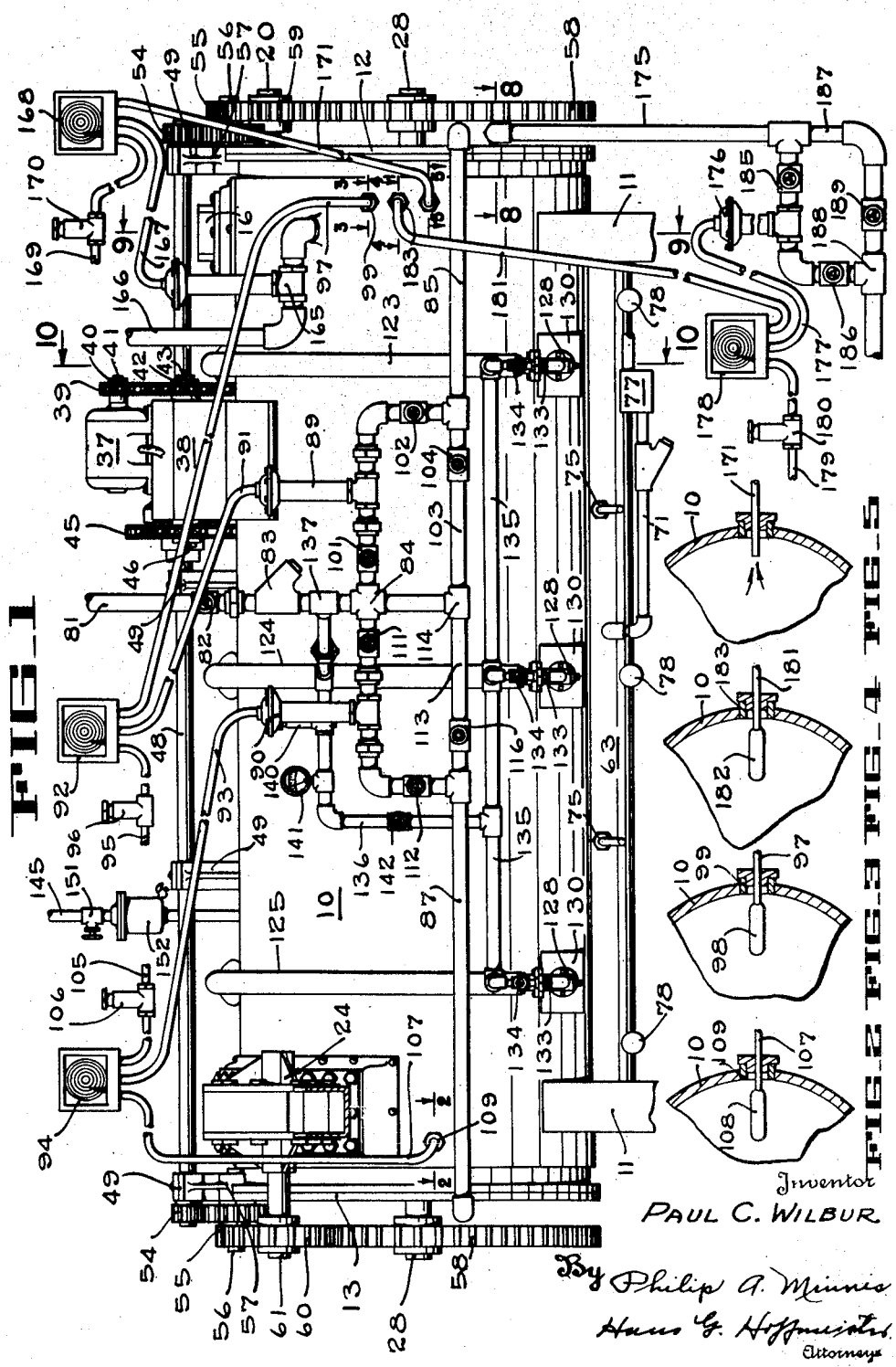

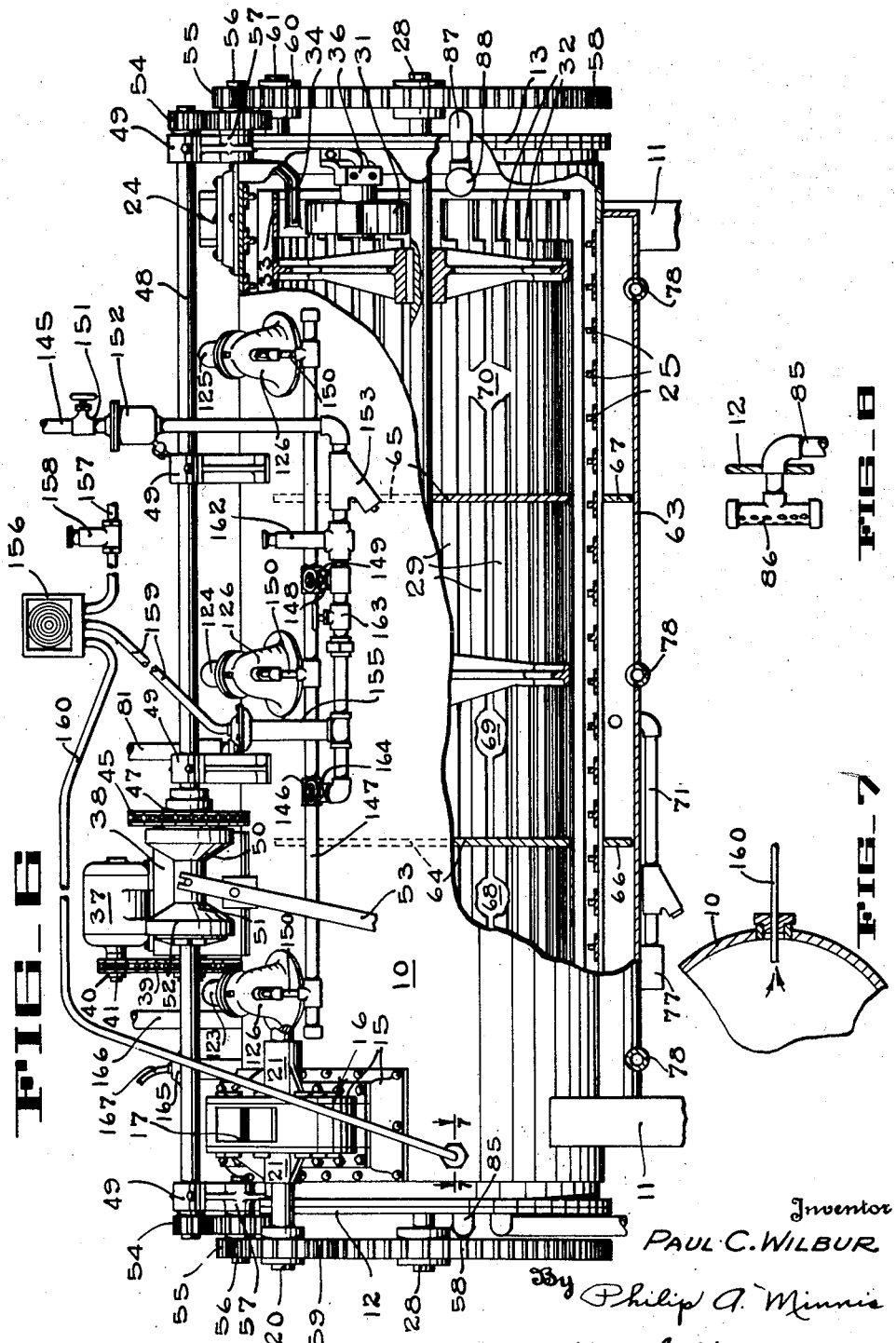

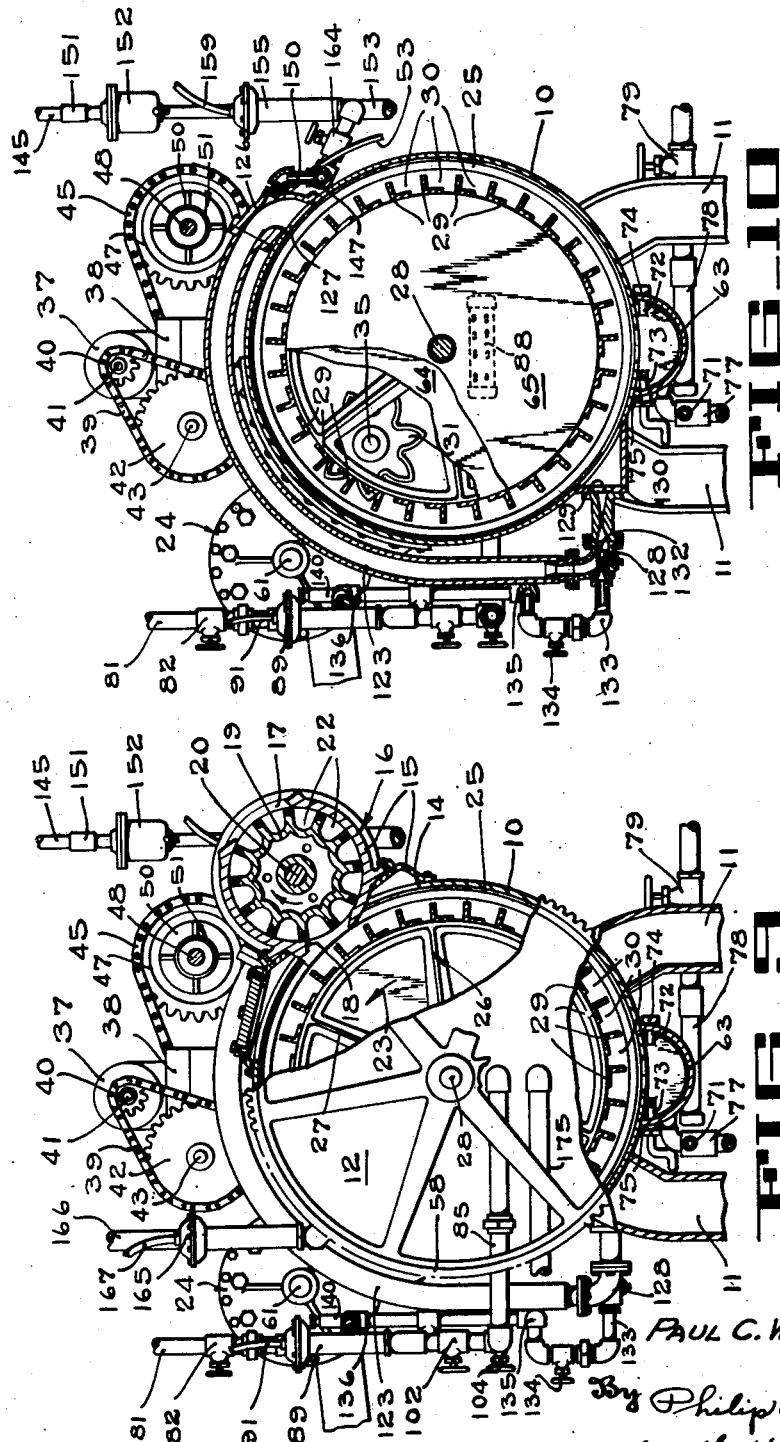

2,536,116

UNITED STATES PATENT OFFICE 2,536,116

METHOD AND APPARATUS FOR HEAT-TREATING FOODSTUFFS IN CONTAINERS

Paul C. Wilbur, San Jose, Calif., assignor to Food Machinery and Chemical Corporation, San Jose, Calif., a corporation of Delaware Application September 21, 1946, Serial No. 698,413

15 Claims. (Cl. 99—212)

The present invention relates to the canning art, and is particularly concerned with a method of and apparatus for heat treating foods and food products in hermetically sealed containers (hereinafter referred to as "cans") for purposes of preservation.

Food products of the so-called non-acid type, such as vegetables, evaporated milk, meat, etc., after being packed in sealed containers are heat treated either in a water immersion type of pressure cooker, or in a gaseous type of pressure cooker in which the heating medium is steam. Even acid types of food products, such as fruit, are sometimes processed in such equipment.

The steam type pressure cooker has certain generally accepted advantages for heat treating canned food products, such as economy, speed, and accuracy of heating, etc. However, some products cannot be properly or economically treated in steam atmospheres.

As has been pointed out in my copending application Serial No. 614,234, filed September 4, 1945, for a Method of and Apparatus for Heat Treating Evaporated Milk, it is necessary in the processing of evaporated milk to heat the canned milk in an atmosphere of steam and air so as to prevent "burn-on." In the apparatus disclosed in the above identified application, a heat exchange vessel is used which is operated at uniform temperature and pressure throughout the vessel, and, consequently, a uniform composition of steam and air is employed. The use of this type of heat exchange equipment has certain limitations. For instance, where a can of milk is introduced into the steam air atmosphere in a heat exchanger having a single chamber, it is necessary to use throughout such heat exchanger a composition of steam and air which will prevent "burn-on" at the entry point. As the cans of milk pass through the heat treating chamber, the milk gradually becomes heated however and less susceptible to "burn-on." Therefore, at each step in progressing through the heat exchanger, less air is required to prevent "burn-on" than the amount of air which is actually used, and which is necessary to prevent the "burn-on" of the milk at the moment the cans enter the heat treating chamber.

The rate of heat penetration into the milk in the cans increases as the percentage of air of the steam-air mixture is reduced. In order to prevent "burn-on" at the entry point of the heat treating chamber, it is necessary to use throughout the chamber, a composition producing a slower rate of heat input than would be obtained if the steam and air composition in contact with the cans is at each moment exactly that required to prevent "burn-on."

A further difficulty when heat exchange equipment having a single uniform temperature is employed for heat treating milk, is the fact that, in order to prevent "burn-on" of the cans at the entry point of the heat treating chamber, it is necessary to use a relatively high percentage of air. If a high steam temperature is also used, the total pressure may become greater than the cans can stand and paneling will result.

Explanations of these two situations follow: In the single chamber, or non-gradient heat exchanger, if it is desired to use a temperature of 235° F. with an initial milk temperature of 50° F., examination of the chart in Fig. 1 of my above identified copending application shows that, to prevent "burn-on," it would be necessary to use 45.8% air. Such a mixture has a total pressure of 26 pounds per square inch which would cause paneling of the cans. In order to avoid paneling, it is necessary, therefore, to use a pressure not exceeding 20 pounds. A temperature of 225° F., with a milk temperature of 50° F. would require 45.4% air to prevent "burn-on" which corresponds to a gauge pressure of 20 pounds. The desirable higher temperature of 235° F. without the corresponding pressure may be used in a gradient heat exchanger by setting the conditions at the inlet end so as to prevent "burn-on" and also prevent paneling, namely 20 pounds gauge pressure, 45.4% air and 225° F. The temperature at the discharge end may be maintained at 235° F. and the same pressure of 20 pounds. As far as "burn-on" is concerned, it would be possible, as seen from the chart, Fig. 1 of my above referred to copending application, to use a still richer composition at the discharge end of the heat exchanger provided it is of sufficient length to enable the cans to heat up so that the relation between composition and temperature at any point in the unit will bear the same relation as that shown in Fig. 1 of my copending application, Serial No. 614,234.

In other words, in order to get the maximum rate of heat input without producing "burn-on," the relation between the can temperature and the composition at any point in a gradient heat exchanger will bear the relationship shown in Fig. 1 of my copending patent application.

One object of my invention is to provide a method for processing goods packed in hermetically sealed containers wherein the containers are successively passed through regions of a gaseous heating medium of varied temperature and uniform pressure.

Another object of the invention is to provide a method for heat treating evaporated milk in sealed containers by which the containers are processed in a gaseous heating medium having uniform pressure and graduated heating zones.

Another object is to provide a method of heat treating milk in sealed containers which makes it possible to employ graduated temperatures and uniform pressure without causing "burn-on."

A further object is to provide a method of heat treating milk in sealed containers which makes it possible to employ graduated temperatures and uniform pressure without causing paneling.

Another object of the invention is to provide an improved apparatus for heat treating evaporated milk in sealed containers whereby "burn-on" is eliminated; the time required for heat treatment is shortened; and a product having improved color and flavor is produced.

Still another object is to provide a heat exchange apparatus for heat treating evaporated milk in a heating medium composed of a mixture of steam and air in which the composition of the steam and air mixture can be varied from the can entry end of the heat treating chamber to the can discharge end in such a way as to give maximum rate of heat input and at the same time prevent "burn-on."

It is a further object of this invention to provide a vessel for processing evaporated milk in hermetically sealed cans in which a high can discharge temperature may be obtained without the necessity of using excessive pressure in order to prevent "burn-on."

The method and apparatus of my invention will best be understood from the following detailed explanation and description taken in connection with the accompanying drawings in which:

Fig. 1 is a side elevation of a heat exchange apparatus for practicing the process of the present invention, certain control mechanisms being diagrammatically shown associated therewith.

Fig. 2 is a horizontal section taken along the line 2—2 of Fig. 1.

Fig. 3 is a similar section taken along the line 3—3 of Fig. 1.

Fig. 4 is a similar section taken along the line 4—4 of Fig. 1.

Fig. 5 is a similar section taken along the line 5—5 of Fig. 1.

Fig. 6 is a side elevation, partly in section, of the heat exchange apparatus as viewed from the opposite side as shown in Fig. 1, the air pressure control mechanism being diagrammatically shown.

Fig. 7 is a horizontal section taken along the line 7—7 of Fig. 6.

Fig. 8 is a horizontal section taken along the line 8—8 of Fig. 1.

Fig. 9 is a vertical transverse section taken along the line 9—9 of Fig. 1, certain parts being shown in elevation.

Fig. 10 is a similar view taken along the line 10—10 of Fig. 1.

The heat exchanger comprises a cylindrical casing or shell 10 supported on legs 11 (Figs. 1 and 6). The shell 10 is tightly closed at its ends by means of closure heads 12 and 13 so as to provide a pressure tight treating chamber therewithin. As shown in Fig. 9 adjacent the end of the heat exchanger having the closure head 12, the shell 10 is formed with an opening 14. Mounted on the shell 10 in pressure tight relation therewith and enclosing the opening 14, is the casing 15 of an inlet valve assembly, generally indicated at 16, and preferably of conventional construction similar to that shown in United States Reissue Patent No. 15,344 to R. A. Thompson, dated April 11, 1922.

The casing 15 of the inlet valve assembly 16 (Fig. 9) is formed with an inlet opening 17 through which the cans are delivered to the valve from a feeder or elevator (not shown) in well known manner. Between the valve casing 15 and the shell 10 there is a discharge opening 18 which is in registration with the opening 14 and through which the cans are discharged into the heat exchanger.

Within the valve casing 15 is a rotary turret valve 19 secured to a drive shaft 20 journalled in bearings 21 (Fig. 6). The turret 19 is provided with a series of can receiving pockets 22 and is driven by means presently to be described in the direction indicated by arrow 23 (Fig. 9) so that a can disposed in one of the valve pockets 22 is carried around until it is discharged by gravity into the interior of the heat exchanger through the discharge opening 18.

Suitable packing means (not shown), such as illustrated in the aforesaid Thompson Reissue Patent No. 15,334, are provided to insure pressure tight relation between the inlet valve 19 and its casing 15 so as to prevent loss of pressure from the interior of the heat exchanger through the inlet valve assembly.

At the discharge end of the heat exchanger the shell 10 is similarly provided with an outlet opening through which the cans are discharged into a discharge valve assembly 24 (Fig. 1) which is similar in construction to the inlet valve assembly 16 and therefore need not be further described.

The mechanism for conveying the cans through the heat exchanger (see Figs. 6, 9, and 10) is of the so called "reel and spiral" construction and is preferably like that illustrated in United States Letters Patent to A. R. Thompson No. 2,211,801, dated August 20, 1940. It comprises a helix-like T-iron guide track 25 secured to and extending around the inside wall of the shell 10 from the inlet opening 14 to the discharge opening so as to form a generally helically trending canway for guiding the cans from the inlet opening to the discharge opening. The cans are advanced along this canway by means of a rotary reel 26 made up of a plurality of spaced spider wheels 27 secured to a central drive shaft 28 and carrying a series of angle iron pusher bars 29 on their peripheries so as to form a series of can channels 30 (Figs. 9 and 10) on the outer periphery of the reel extending longitudinally thereof.

The foregoing arrangement is such that as the cans drop from the inlet valve 19 through the opening 18 they are received in the can channels 30 of the reel 26, and, as the reel rotates, the helically trending T-iron guide 25 engages the ends of the cans and shifts them endwise until they reach the discharge opening. At this point the cans are pushed from between the pusher bars 29 into the discharge valve assembly 24 by means of the usual ejector or star wheel 31 (Figs. 6 and 10) which intermeshes with and is driven by the pusher bars 29. The base flanges of the pusher bars 29 are cut away as indicated at 32 (Fig. 6) to permit the teeth of the ejector wheel to project between said bars, and the cans are prevented from dropping through these cut away portions as they approach the ejector wheel by means of a semi-circular supporting plate or platform 33 supported by brackets 34 secured to the inner wall of the heat exchanger shell 10 just beyond the ends of the pusher bars. The star wheel 31 is journalled on a stub shaft 35 secured to a bracket 36 which is also secured to the inner wall of the heat exchanger shell 10 just beyond the ends of the pusher bars, as shown best in Fig. 6.

The drive mechanism (see Figs. 1 and 6) for the reel 26, and the inlet and discharge valve assemblies 16 and 24, comprises an electric motor 37 mounted on the casing 38 of a conventional variable speed power transmission unit secured to the top side of the heat exchanger shell 10. A drive chain 39 is trained around a sprocket 40 secured to the motor shaft 41 and drives a sprocket 42 secured to the power input shaft 43 of the transmission unit. Another chain 44 (Fig. 9) is trained around a sprocket 45 secured to the power take-off shaft 46 of the transmission unit and drives a sprocket 47 loosely journalled on the main drive shaft 48 which is in turn journalled in a plurality of bearings 49 secured to the top of the heat exchanger shell 10.

The sprocket 47 is secured to one of the clutch elements of the clutch unit 50 forming part of a combined clutch and brake assembly 51 in which the brake unit is indicated at 52. Since this clutch and brake assembly is of conventional construction it is deemed unnecessary to describe it in detail. Suffice it to say that such clutch and brake assembly is actuated by a lever 53 and the arrangement is such that when the lever is shifted in one direction the brake unit 52 is disengaged and the clutch unit 50 is engaged to transmit power from the sprocket 47 to the main drive shaft 48. When the lever 53 is shifted in the other direction the clutch unit 50 is disengaged so as to disconnect the main drive shaft 48 from the sprocket 47 and the brake unit 52 is engaged to prevent continued rotation of the shaft by the momentum of the mechanism associated with it.

Each end of the main drive shaft 48 (Fig. 6) is provided with a pinion 54 intermeshing with the larger gear of a double gear 55 secured to a stub shaft 56 journalled in a bracket 57 secured to the heat exchanger shell 10. The smaller gears of the double gears 55 intermesh with bull gears 58 secured to the ends of the reel shaft 28 which project outwardly from the heat exchanger. With this arrangement power is applied to both ends of the reel shaft so as to prevent twisting of the reel under the heavy loads to which it is subjected.

The inlet valve 19 is driven from the adjacent bull gear 58 by means of a pinion 59 secured to one of the ends of the valve shaft 20 which project outwardly from the valve casing. The valve in the discharge valve assembly 24 is driven from the bull gear 58 adjacent to the discharge end of the machine by means of a pinion 60 secured to the discharge valve shaft 61 (Fig. 6).

The usual collecting trough 63 is formed on the bottom of the heat exchanger shell 10 and in open communication with the interior thereof for the purpose of receiving and facilitating the removal of condensate, trash and contents of ruptured cans which may drop down into it through the openings between the convolutions of the T-iron guide track 25.

As shown in Fig. 6, fixedly mounted within the reel 26 so as to rotate therewith, are imperforate plates 64, 65 and mounted within the collecting trough 63 and in alignment with said plates 64, 65, are plates 66, 67, respectively. The plates 64, 65 are in the nature of circular disks which, with the plates 66, 67, provide means for dividing the interior of the heat exchanger shell 10 and the trough 63 into a plurality of sections or compartments 68, 69, and 70. Peripherally these compartments communicate through the continuous canway formed by the T-irons 25 and the bars 29, but when the apparatus is in operation and the canway is filled with cans, the communication between the chambers is but slight, and renders it possible in practice, to maintain in each compartment, a degree of temperature different from that in others. At the same time the pressure of the heating medium within the heat exchanger shell 10 is uniform throughout. The manner in which the plates 64, 65 are disposed within the reel 26 is such that said plates do not interfere with free movement of the cans in the guide track 25.

Normally the plates 66, 67 are adapted to cut off communication through the trough 63. However, in order to permit the flow of liquid lengthwise of the trough from the end compartments thereof towards a drain pipe 71 leading from the midsection of the trough, each plate 66, 67 is provided with aligned shafts 72, 73, which said shafts, are respectively, rotatably mounted in bearings 74, 75 carried by the wall of the trough 63, as shown in Figs. 9 and 10. The shaft 73 of each plate 66, 67 is provided with a crank handle 76 by which the plate can be turned from the closed position shown in Fig. 6 to open position, and vice versa.

The aligned plates 64, 66 and 65, 67 constitute baffles by which the interior of the shell 10 is divided into zones, in each of which a predetermined temperature and fluid composition can be maintained in the manner to be hereinafter more fully described.

The drain pipe 71 is provided with a conventional steam trap 77 which serves in well known manner to permit the flow of condensate water therethrough but prevents steam or air from passing through it. With this arrangement any condensate collecting in the trough 63 is immediately drained off so that water is not allowed to collect in sufficient quantity to reach the cans undergoing treatment within the heat exchanger.

As shown in Figs. 6, 9, and 10, leading from each section of the collecting trough 63 is a conduit 78 having a manually operated valve 79 mounted therein for controlling communication therethrough. The conduits 78 may be tapped into the wall of the trough 63 at points below the point the drain pipe 71 is tapped into the collecting trough, and the valves 79 may be individually actuated to open communication through the conduits so that liquid in each section of the trough can be withdrawn therefrom when necessary or desirable. Normally valves 79 are closed, said valves being adapted to be operated in the manner and for the purpose hereinafter described.

For supplying steam to the heat exchanger a steam supply line 81 (see Fig. 1), provided with a manually controlled master valve 82, leads from any suitable steam boiler (not shown) capable of generating and maintaining steam under pressure at or above that required to obtain the desired temperature at which the heat exchanger is to be operated. The steam supply line 81 is also provided with a strainer 83 of conventional construction which serves to trap and remove solid particles such as pieces of boiler scale or grit which may be entrained with the steam so as to prevent such particles from entering and perhaps interfering with the operation of certain automatic regulators hereinafter referred to.

Leading from a fitting 84 in the steam supply line 81, is a pipe 85 having an end portion extending through the closure head 12 and provided with a diffuser 86 (Fig. 8) through which steam is directed into the compartment 68 at the inlet end of the heat exchanger. A second pipe 87 leads from the fitting 84 and has an end portion extending through the closure head 13 and provided with a diffuser 88 (Figs. 6 and 10) similar to the diffuser 86, through which steam is directed into the compartment 70 at the discharge end of the heat exchanger.

The flow of the steam through the pipes 85, 87 is automatically controlled to supply just the proper quantity to maintain the desired temperature within the several compartments 68, 69, and 70 of the heat exchanger. This is accomplished by means of a pair of diaphragm type reverse acting, air operated regulating valves 89 and 90, inserted in the pipe lines 85 and 87, respectively (see Fig. 1). The diaphragm valve 89 is actuated by compressed air introduced through a pipe 91 leading from an air operated automatic temperature control apparatus 92 to the regulating valve 89 in accordance with the temperature in the compartment 68 at the inlet end of the heat exchanger, and the diaphragm of valve 90 is actuated by compressed air introduced through a pipe 93 leading from an air operated automatic temperature control apparatus 94 to the regulating valve 90 in accordance with the temperature in the compartment 70 at the discharge end of the heat exchanger.

The regulating valves 89 and 90 and the air operated automatic control apparatus therefore are well known and in common use in this art so that a detailed description thereof is deemed unnecessary. This arrangement is, however, diagrammatically illustrated in Fig. 1. Compressed air is supplied to the controller 92 from any suitable source of supply through a pipe 95 provided with a conventional self-acting pressure regulating valve 96. The quantity of air admitted by the controller from the pipe 95 into the pipe 91 is regulated by suitable mechanism within the controller which is actuated by a heat responsive fluid confined within a tube 97 and closed bulb 98 which latter projects into the heat exchanger through an opening 99 adjacent the inlet end of the heat exchanger so as to be exposed to the temperature of the compartment 68 (see Fig. 3).

It will be understood that the controller 92 is adjustable so that it may be set for any desired temperature and when so set any variation in the temperature within compartment 68 of the heat exchanger immediately acts on the controller through the medium of the heat responsive fluid in the bulb 98 and tube 97 to cause the controller to vary the amount of air passed through it from the pipe 95 to the pipe 91 and thereby actuate the regulating valve 89 to restrict or increase the flow of steam through the pipe line 85 to compensate for such temperature variation. In this manner the temperature within the compartment 68 at the inlet end of the heat exchanger is constantly maintained at whatever temperature the controller 92 is set. Manually controlled valves 101 and 102 in the pipe line 85 are normally open but may be closed to permit the removal of the regulating valve 89 for emergency repairs or replacement without loss of steam pressure from the compartment 68 of the heat exchanger. However, when the valves 101 and 102 are closed and the regulating valve 89 removed from service, steam may be supplied to the compartment 68 from the steam supply line 81, through a pipe 103 which leads from the fitting 84 and is connected to the pipe 85 at a point between valve 102 and the diffuser 86. The flow of steam through pipe 103 is controlled by a manually operated valve 104. Normally valve 104 is closed so that communication through the by-pass line 103 is cut off.

In a similar manner compressed air is supplied to the controller 94 from any suitable source of supply through a pipe 105 provided with a valve 106 similar to the valve 96 heretofore referred to. The quantity of air admitted by the controller from the pipe 105 into the pipe 93 is regulated by suitable mechanism within the controller which is actuated by a heat responsive fluid confined within a tube 107 and closed bulb 108 which latter projects into the heat exchanger through an opening 109 adjacent the discharge end of the heat exchanger so as to be exposed to the temperature within the compartment 70 (Fig. 2).

It will be understood that the controller 94 is adjusted so that it may be set for any desired temperature and when so set, any variation in the temperature within the compartment 70 of the heat exchanger immediately acts on the controller through the medium of the heat responsive fluid in the bulb 108 and tube 107 to cause the controller to vary the amount of air passed through it from the pipe 105 to the pipe 93 and thereby actuate the regulating valve 90 to restrict or increase the flow of steam through the pipe line 87 to compensate for such temperature variation. In this manner the temperature within the compartment 70 at the discharge end of the heat exchanger is constantly maintained at whatever temperature the controller 94 is set.

Manually controlled valves 111 and 112 in the pipe line 87 are normally open but may be closed to permit the removal of the regulating valve 90 for emergency repairs or replacement without loss of steam pressure from the compartment 70 of the heat exchanger. When the valves 111 and 112 are closed and the regulating valve 90 removed from service, steam may be supplied to the compartment 70 from the steam supply line 81 through pipe 113 which connects a T-fitting 114 connected in pipe 103 with a T-fitting 115 mounted in pipe 87 at a point between valve 112 and diffuser 88. The flow of steam through pipe 113 is controlled by a manually operated valve 116. Normally valve 116 is closed so that communication through the by-pass pipe 113 is cut off.

Air is also introduced into the heat exchanger shell 10 to mix with the steam and form the desired steam-air heating medium in the several compartments or zones 68, 69, and 70. I have therefore provided for continuous automatic circulation and agitation of the heating medium and the means for accomplishing this is best seen in Figs. 1, 6, 9, and 10.

It will be observed that conduits 123, 124, and 125 extend over and partly around the shell 10 of the heat exchanger at spaced locations throughout its length, there being three of these in the illustrated embodiment, one for each compartment 68, 69, and 70, respectively.

The upper end of each conduit 123, 124, and 125 communicates with the interior of the heat exchanger through an elbow 126 secured in pressure tight relation to the shell 10 over an opening 127 in the shell. At their lower end each conduit 123, 124, and 125 connects with a steam injector 128 arranged to discharge into the heat exchanger through an opening 129 in the side wall of a squared offset portion 130 of the heat exchanger shell 10 (Fig. 10).

Steam is continuously supplied to nozzles 132 in the injectors 128 by pipes 133 provided with manually controlled valves 134 and leading from an auxiliary distributor pipe 135 to which steam is supplied through a pipe line 136. The latter is connected to the pipe line 81 through a T-fitting 137 and is provided with a self-acting pressure responsive pressure regulating valve 140 of conventional construction which serves to regulate the flow of steam through said pipe line so as to insure a constant pressure steam supply to the injectors 128. The pipe line 136 is also provided with a pressure indicating gauge 141 and a normally open manually controlled valve 142.

From the construction so far described it will be seen that the injector nozzles 132 are supplied with steam at constant pressure so as to create and maintain a circulation of the heating medium from each of the compartments 68, 69, and 70 of the heat exchanger into the elbows 126 and thence through the conduits 123, 124, and 125 and back into the compartments 68, 69, and 70 through the injector nozzles 132, although the operation is entirely independent of the main steam supply through the pipe lines 85 and 87 and diffusers 86 and 88. Thus the injectors are in constant operation and continue to operate even when the temperature within the heater is at the desired point and the main steam supply is temporarily cut off by the regulating valves 89 and 90. The circulation of heating medium through the conduits 123, 124, and 125 is therefore continuously maintained at all times during operation of the apparatus and it serves to keep the heating medium in the several compartments of the heat exchanger in a constant state of agitation so as to distribute the air throughout each compartment and maintain uniformity in the mixture therein.

It may be explained here that the continuous operation of the injectors 128 will not normally cause any rise in temperature within the pressure heater compartments above that at which the regulating valve controllers 92 and 94 are set. The reason for this is that the injector nozzles 132 are not large enough to admit sufficient steam to compensate for the various heat losses such as leakage, radiation through the shell 10 of the heat exchanger, withdrawal of heating medium by the inlet and discharge turret valve pockets, absorption of heat by the cans passing through the heat exchanger and by air introduced into the heat exchanger by the turret valve pockets, etc. In fact I prefer to limit the size of the injector nozzles 132 so that, under the pressure conditions determined by the setting of the pressure regulating valve 140, they will supply just slightly less steam than necessary to compensate for the heat losses when the heat exchanger is idle, i. e., no cans flowing through it and the reel 28 and turret valves stationary. With the heat exchanger illustrated, which is uninsulated as customary, I have found that the size of the injector nozzles 132 may be so limited and yet be large enough to create the desired amount of circulation and agitation of the heating medium, and such nozzles are therefore employed. Thus, in the event it should become necessary or unavoidable to interrupt the operation of the device, as in the case of a power failure or breakdown of other equipment in the line, the injectors 128 will continue to operate without causing any temperature rise in the heat exchanger and the desired conditions will be maintained in it.

Compressed air is supplied to the heat exchanger by a pipe line 145 (Fig. 6) leading from any suitable source of air supply capable of supplying air in sufficient quantities and at the pressure necessary to maintain the desired proportion of air in the steam-air heating medium in the several zones in the heat exchanger provided by the compartments 68, 69, and 70. The air supply line 145 is connected at 146 to a distributor pipe 147 extending longitudinally of the pressure heater, and a by-pass pipe 148 provided with a normally closed manually controlled valve 149 also connects the air supply pipe with the distributor pipe 147. Branch pipes 150 leading from the distributor pipe 147 open into the elbows 126 to direct air through the elbows in the direction of the conduits 123, 124, and 125, respectively.

By this arrangement it will be seen that the air is not introduced directly into the shell of the pressure heater but enters by way of the conduits 123, 124, and 125, respectively, due to the flow in these conduits induced by the injectors 128. This affords an opportunity for the air to become thoroughly mixed with the steam before it enters the heat exchanger and at the same time warms up the air so that no local cold spots are created in the heat exchanger.

The air supply line 145 is provided with a manually controlled master valve 151, an oil separator 152, and a strainer 153, all of which are of conventional construction. The oil separator 152 serves to remove any entrained oil from the air so that it will not enter the heat exchanger and foul the air passing therethrough. The strainer 153 removes grit and other solid particles from the air.

The flow of air through the supply line 145 is automatically controlled to supply just the proper quantity to maintain the desired total pressure within the heat exchanger and consequently the desired proportions of the air-steam mixture. This is accomplished by means of a diaphragm type reverse acting air operated regulating valve 155 which is inserted in the air supply line and is of the same construction as the regulating valves 89 and 90 previously referred to. The regulating valve 155 is also actuated by an automatic control mechanism similar to that associated with the regulating valves 89 and 90, except that in this case the control mechanism is responsive to the pressure within the heat exchanger instead of the temperature.

The type of automatic pressure control mechanism just referred to is also well known and in common use in this art so that a detailed description thereof is unnecessary, but the arrangement is diagrammatically illustrated in Fig. 6. In this figure, 156 indicates the pressure controller, which is illustrated as being of the recording type, and to which compressed air is supplied from any suitable source through a pipe 157 provided with a conventional pressure responsive self-acting pressure regulating valve 158. The quantity of air admitted by the controller from the pipe 157 into the pipe 159 through which it flows into the regulating valve 155 to actuate it, is regulated by suitable mechanism within the controller which is actuated by the pressure within the heat exchanger transmitted to the controller through a tube 160 opening through the shell 10 of the heat exchanger adjacent its inlet end, as shown in Fig. 7.

The pressure controller 156 is adjustable so that it may be set for any desired pressure and when so set any variation in the pressure within the pressure heater is immediately transmitted to the controller through the tube 160 to cause the controller to vary the amount of air passed through it from the pipe 157 to the pipe 159 and thereby actuate the regulating valve 155 to restrict or increase the flow of air through the pipe line 147 to compensate for such pressure variation. In this manner the total pressure within the pressure heater is constantly maintained at whatever pressure the controller 156 is set. It will be understood, of course, that the controller 156 is set for a higher pressure than the pressure of steam at the temperature for which the controllers 92 and 94 are set so that the air is admitted into the heat exchanger until the total combined pressure of the steam and air is that required for the desired proportioning of the mixture.

The air supply line 145 is also provided with a conventional pressure responsive, self-acting, pressure regulating valve 162 located just ahead of the regulating valve 155. The reason for this is that air pressure from the average source of supply is apt to vary within fairly wide limits and as diaphragm type regulating valves, such as that indicated at 155, are rather sensitive in their operation, it is desirable to keep the pressure of the air supply within reasonably close limits to prevent the regulating valve from "hunting." This is accomplished by the self-acting regulating valve 162. Manually controlled valves 163 and 164 in the air supply line 145 are normally open, but may be closed to permit the removal of the regulating valve 155 for emergency repairs or replacement without loss of pressure from the heat exchanger. When these valves are closed, the valve 149 in the by-pass pipe 148 may be operated to regulate the air supply by hand if desired until the regulating valve 155 is again put into operation.

In addition to the control mechanisms hereinabove described, the heat exchanger is also provided with a master pressure regulating blow-off mechanism for preventing excessive rise in pressure (and, consequently, temperature also) in the event of abnormal circumstances such that the regulating valves 89, 90, and 155 should fail to maintain the temperature and pressure conditions for which their controllers are set. Such circumstances might be met with, for example, if either of the regulating valves 89, 90, and 155 should fail to seat tightly when closed and thereby allow steam or air to flow into the heat exchanger in excess of the heat or air losses; or in the event that the operation of the reel 26 should be interrupted and during such interruption the heat losses should, for any reason, become less than the heat supplied by the injector nozzles 132.

The master pressure regulating blow-off mechanism referred to comprises a diaphragm type, direct acting, air operated, regulating valve 165 inserted in a blow-off pipe 166 tapped into the upper portion of the heat exchanger shell. The regulating valve 165 is of the same construction as the regulating valves 89, 90, and 155 hereinbefore referred to except that it normally closes the pipe 166 in which it is inserted and the air introduced into it through the pipe 167 serves to open it instead of to close it. This type of regulating valve is also of conventional and well known construction and needs no description. The supply of compressed air to the regulating valve 165 through the pipe 167 is controlled by an automatic controller 168, which is indicated in Fig. 1 as being of the recording type, and to which compressed air is supplied from any suitable source through a pipe 169, provided with a conventional pressure responsive, self-acting, pressure regulating valve 170. The quantity of air admitted by the controller from the pipe 169 into the pipe 167 is regulated by suitable mechanism within the controller 168 which is actuated by the pressure within the heat exchanger transmitted to the controller through a tube 171 opening through the shell 10 of the heat exchanger adjacent its inlet end, as shown in Figs. 1 and 5.

The controller 168 for the regulating valve 165 is set to operate at a pressure slightly higher (one or two pounds, for example) than the controller for the regulator 155 so that normally it is inoperative and maintains the blow-off pipe 166 closed. Should the pressure in the heat exchanger rise, however, beyond that for which the controller 156 is set, then the controller 168 for the regulating valve 165 will open it and allow the escape of heating medium so as to prevent the pressure (and, consequently, the temperature also) from rising to a harmful extent. At the same time the escape of heating medium serves as a warning that the heat exchanger is not operating in accordance with the conditions for which the air and steam supply controls are set, and in order to bring it back into proper operating conditions, the operator may manipulate the manually controlled valves 79 in the conduits 78 leading from the collecting trough 63 to bring the pressure down to the point where the automatic controls take over again and in this way maintain the desired conditions in the heat exchanger until the abnormal circumstances which caused the improper operation are rectified. In the event it is desired to maintain a water level in the heat exchanger, the conduits 78 may be tapped into the shell 10 at a point above the desired water level instead of into the collecting trough 63 so as to avoid discharge of water when the valves 79 are opened.

When canned evaporated milk is being processed in the apparatus, it will be understood that the addition of the proper amount of air to the steam functions to prevent "burn-on" only during the time the cans of milk are in contact with the steam-air mixture. Therefore, if any water bath is maintained or allowed to accumulate in the heat exchanger to a sufficient depth that the cans are immersed or dipped into it during their travel through the heat exchanger, and if the depth and temperature of such water bath is such as would otherwise result in "burn-on" during the time the cans are in it, then the presence of the air in the steam-air mixture maintained above the bath will not prevent such "burn-on."

It will be apparent, of course, that the length of time the cans are in any water bath in the preheater will depend upon the depth of such bath and, further, that whether "burn-on" will or will not occur while the cans are in it, and if so, to what extent, will depend not only upon such time but also upon the temperature of the bath and the temperature of the milk. The precise amount of water which can be permitted to be in the heat exchanger without causing "burn-on" is accordingly variable, depending upon the particular circumstances of each individual case. It may be stated, however, that in actual tests on Federal standard evaporated milk with the heat exchanger as illustrated, I have found that "burn-on" is likely to result if a water bath having a temperature approximately that of the steam-air heating medium is maintained or permitted to accumulate in the heat exchanger to a depth in excess of that which causes the lowermost can in the reel to be fully immersed in it, and the greater the depth of such water bath, the heavier the "burn-on" will be. It is, therefore, necessary to provide suitable mechanism for preventing or limiting the accumulation of water in the preheater in sufficient quantity to cause undesirable "burn-on" in spite of the use of the steam-air mixture.

Generally speaking, the use of a water bath in the heat exchanger is neither necessary nor advantageous. On the other hand it has the disadvantage of accelerating corrosion of the mechanism coming into contact with it, due to the presence of so much air in the heating medium. Therefore, I prefer to operate the heat exchanger without any water in it. In order to prevent the accumulation of water in the heat exchanger, I provide the drain pipe 71 leading from the collecting trough 63 adjacent its bottom to any suitable point of discharge.

Normally, during operation of the apparatus the several control mechanisms 92, 94, 156, and 168 will maintain the temperatures and pressure of the heating medium within the shell 10 so that the relationship between the composition and temperature at any point in the heat exchanger will be such that the canned goods will be properly heat treated in the desired manner. However, should the temperature within the compartment 68 at the inlet end of the heat exchanger rise to a point above that at which it is desired to introduce the cold cans thereto, in order to quickly lower the temperature of compartment 68 without changing the setting of any of the controllers 92, 94, 156, and 168, cold water can be introduced into said compartment through a cold water pipe 175 having an end portion extending through the closure head 12 and provided with a nozzle or spray head similar to the diffuser 86 shown in Fig. 8.

The flow of water through the pipe 175 may be automatically controlled to supply just the proper quantity to lower the temperature within the compartment 68 the desired number of degrees. This may be accomplished by means of a diaphragm type, direct acting, air operated, regulating valve 176, inserted in the cold water pipe 175. The regulating valve 176 is of the same construction as the regulating valves 89 and 90 hereinbefore referred to except that it normally closes the pipe 175 in which it is inserted, and the air introduced into it through the pipe 177 serves to open it instead of to close it. This type of regulating valve is also of conventional and well known construction and needs no description. The supply of compressed air to the regulating valve 176 through the pipe 177 is controlled by an automatic controller 178, which is indicated in Fig. 1 as being of the recording type, and to which compressed air is supplied from any suitable source through a pipe 179 provided with a conventional, pressure responsive, self-acting, pressure regulating valve 180. The quantity of air admitted by the controller 178 from the pipe 179 into the pipe 177 is regulated by suitable mechanism within the controller which is actuated by a heat responsive fluid confined within a tube 181 and closed bulb 182, which latter projects into the heat exchanger through an opening 183 adjacent the inlet end of the shell 10 so as to be exposed to the temperature of the compartment 68 (see Fig. 4).

The controller 178 for the regulating valve 176 is set to operate at a temperature slightly higher than the controller 92 for the regulating valve 89 so that it is normally inoperative and maintains the cold water pipe 175 closed. Should the temperature within the compartment 68 rise, however, beyond that for which the controller 92 is set, then the controller 178 for the regulating valve 176 will open said valve so that cold water is admitted to compartment 68 to quickly cool the heating medium therein. In this way the temperature within compartment 68 may be restored to the desired number of degrees by which proper operating conditions will be had in compartment 68.

Manually controlled valves 185 and 186 in the pipe line 175 are normally open, but may be closed to permit the removal of the regulating valve 176 for emergency repairs or replacement. However, when the valves 185 and 186 are closed, cold water may be supplied to the compartment 68 through pipe 187, which leads from a T-fitting 188 and is connected to the pipe 175 at a point between the valve 185 and the end of the pipe within the compartment 68. The flow of water through pipe 187 is controlled by a manually operated valve 189. Normally, valve 189 is closed so that communication through the by-pass pipe 187 is cut off.

For heat treating hermetically sealed containers of food products, the operation of my invention, for illustrative purposes, may be as follows:

The controller 92 is set to provide for a temperature in the compartment 68 at the inlet end of the heat exchanger of the desired degree to prevent damage to the goods contained therein when the cans are introduced through the inlet turret valve 19 into said compartment. In some instances, the temperature at the inlet end of the shell 10 should be approximately 225° F. The controller 94 is set so that a different temperature will be maintained in the compartment 70 at the discharge end of the heat exchanger. The desired temperature of compartment 70 may be approximately 235° F. so that a gradient of 10° F. would be provided in the shell 10 from the can inlet end to the can discharge end thereof. Controller 156 is then set so that the desired pressure of air within the shell 10 will be had. For instance, it may be desired to maintain a pressure of approximately 20 pounds per square inch within the shell. It will be understood, however, that a higher temperature differential may be used as desired, and obviously, the amount of pressure can be varied to suit varying conditions, the above examples being given merely for illustrative purposes only. In any event, since the heating medium is a composition of steam and air, the temperature in the intermediate compartment 69 will be the mean of the temperature at the extreme ends of the heat exchanger. I have also discovered in actual practice that, according to the present invention, it is not necessary to introduce steam directly into the intermediate compartment 69 for the purpose of maintaining a predetermined temperature therein. In fact, I have discovered that, during operation of the apparatus, when the cans are moving through the canway in the shell in a continuous stream, sufficient heat to maintain the desired temperature of the heating medium in the inlet compartment 68 and in the discharge compartment 70 may be had solely with steam delivered through the diffuser 88 at the end of the steam supply pipe 87 leading into the discharge compartment 70. The heat from the steam thus introduced into the discharge compartment 70, since it is a vapor, will mix readily with air under pressure, which is constantly circulated through the shell 10 by the injectors 128, and as the result the hot heating medium moves toward the compartment 68 at the inlet end of the heat exchange thereby compensating for heat losses resulting from absorption of heat by the cold cans delivered to the compartment 68 by the feed turret 19. In this way, the proper temperature of heating medium in the compartment 68 can be maintained so that the cans will be heat treated in the manner desired.

During operation of the apparatus, the line of containers moving through the heat exchanger may be halted. This arresting of movement of the containers undergoing heat treatment within the shell 10 may result in a quick build-up of temperature within the compartment 68 to such an extent as to result in "burn-on." When such a condition arises, cold water can be introduced into the compartment 68 at the inlet end of the shell 10 through cold water pipe 175 to thereby bring the temperature down to the desired operating temperature at the inlet end of the shell 10. If desired, suitable means may be provided within the shell for preventing the cold water discharged from pipe 175 from coming directly into contact with the containers in the reel 26. Surplus water admitted to the compartment 68 for this purpose will collect in the section of the trough 63 underlying compartment 68, and can be withdrawn therefrom through conduit 78, located in this section of the trough by opening valve 79, associated therewith.

Having thus described the method and apparatus of my invention and in what manner the same may be used, what I claim as new and desire to protect by Letters Patent is:

1. The method of processing sealed cans of food products comprising heating said sealed cans by passing them through a confined heating region containing a heating medium composed of a mixture of non-condensable gas and steam, maintaining a predetermined pressure of the mixture throughout the heating region, and maintaining a gradient in temperature of the mixture which temperature gradient increases in the direction in which the cans pass through the heating region.

2. The method of processing sealed cans of food products which comprises heating said sealed cans by passing them through a confined heating region containing a heating medium composed of a mixture of non-condensable gas and steam, maintaining a predetermined pressure of the mixture throughout said region, maintaining a predetermined temperature at the can entry end of said region, and gradually increasing the temperature of the mixture in the direction in which the cans pass through said region.

3. An apparatus for processing sealed cans of food products comprising a heat treating vessel having a plurality of heat treating compartments, means for conveying the cans successively through the compartments of said vessel, means for introducing into the vessel a heating medium comprising a mixture of steam and non-condensable gas under a predetermined pressure, pressure responsive means for maintaining the pressure of the heating medium substantially uniform in the several compartments of the vessel, and temperature responsive means for maintaining a temperature gradient of the heating medium within the vessel increasing in the direction in which the cans pass through the vessel.

4. An apparatus for heating food in sealed cans comprising a vessel having a can inlet at one end and a can discharge outlet at its other end, means for conveying the cans through the vessel from the inlet end to the discharge end, partitions for dividing the interior of the vessel into compartments through which the cans are adapted to move, means for introducing steam individually into each end compartment of the vessel, means for introducing non-condensable gas into each of the several compartments of said vessel, pressure responsive means for controlling the pressure of the non-condensable gas introduced into said vessel, and temperature responsive means for establishing higher temperature in the compartment at the outlet end than in the compartment at the inlet end of the heat exchange vessel.

5. An apparatus for heating evaporated milk in sealed cans comprising a heat treating chamber divided into a plurality of communicating compartments, means for establishing and maintaining a heating medium comprising a mixture of steam and non-condensable gas under a predetermined uniform pressure in said chamber, means for advancing the cans through said chamber, and temperature responsive means for varying the temperature of said heating medium in the several compartments to establish a successively increasing temperature gradient in the heating medium in the direction in which the cans are advanced through said chamber compartments.

6. A method of processing cans of food products comprising the steps of establishing a series of treating zones, establishing and maintaining in each of said zones a heating medium composed of a mixture of steam and air, maintaining said heating medium at the same pressure in each of said zones, maintaining successively higher temperatures in said zones, and heating the cans by passing them through said zones in such sequence as to subject said cans to said successively higher temperatures.

7. An apparatus for processing cans of food products comprising a treating vessel having a series of communicating heating compartments, means for establishing and maintaining in each of said compartments a heating medium composed of a mixture of steam and air, means for maintaining said heating medium at the same pressure in each of said compartments, means for maintaining successively higher temperatures in said compartments, and means for passing the cans through said compartments to heat the same in such sequence as to subject said cans to said successively higher temperatures.

8. The method of processing sealed cans of food products which comprises heating the cans by passing them through a sequence of heating zones containing a mixture of non-condensable gas and steam and varying the ratio of non-condensable gas and steam in consecutive ones of said zones in a manner to establish progressively higher temperatures in said zones in the direction of can travel therethrough, while maintaining a predetermined pressure uniformly throughout said zones.

9. The method of subjecting sealed cans of food products, especially milk, rapidly to high sterilizing temperatures, which comprises heating the cans by entering them into a confined heating region containing a mixture of hot steam and non-condensable gas, establishing such a temperature of said mixture in relation to its proportion of non-condensable gas at the can entry point of said region as will heat up the cans at a maximum rate without causing burn-on or producing pressure strong enough to cause panelling of the cans, varying the ratio of steam to non-condensable gas in said mixture while maintaining its pressure uniform throughout said regions to establish an increasing temperature gradient in said region in a direction away from said entry point, and moving the cans through said region from said entry point in the direction of said gradient.

10. The process of heat treating food products, especially milk, in sealed containers without causing burn-on or panelling, which comprises heating the containers by entering them into a confined heating region containing a mixture of non-condensable gas and hot steam, maintaining such a proportion of said non-condensable gas in said mixture at the container entry point of said region as will prevent burn-on at a sterilizing temperature without producing sufficient pressure in said region to cause panelling of the containers, increasing the proportion of steam in said mixture in a direction away from said entry end to progressively increase the temperature of said mixture without altering the pressure prevailing in said region, and moving the containers through said region in the direction of said temperature increase.

11. An apparatus for heat treating sealed containers of food products, comprising a heat treating chamber having a sequence of communicating compartments, means for conveying the containers successively through said compartments, means for supplying a non-condensable gas under pressure into said compartments, means for supplying hot steam into the last of said sequence of compartments, means for controlling the supply of said non-condensable gas into said compartments to maintain a predetermined uniform pressure throughout said chamber, and means responsive to the temperature at a selected point within said vessel for controlling the supply of steam into said last compartment, to maintain in said compartments a desired temperature gradient decreasing progressively in a direction opposite to the direction of movement of said containers.

12. An apparatus for heat treating sealed containers of food products, comprising a heat treating chamber forming a sequence of communicating compartments; means for injecting into said chamber hot steam and non-condensable gas; means for moving the containers successively through said compartments to thereby heat the same; said injecting means being adapted to establish and maintain successively higher temperatures of the resultant steam and non-condensable gas mixture in consecutive ones of said compartments in the direction of movement of the containers while maintaining the pressure in said compartments at a substantially uniform level; and associated with each of said compartments a circulatory conduit having auxiliary steam injection means adapted to agitate said steam and non-condensable gas mixture to maintain uniformity thereof in each of said compartments.

13. Apparatus for heat treating sealed containers of food products, especially milk, comprising a heat treating chamber forming a sequence of communicating compartments, means for conveying containers successively through said compartments from an entrance point of said chamber to an exit point thereof, means for supplying a heating medium into said vessel comprising a mixture of hot steam and non-densable gas to heat the containers during their advancement through said vessel, means for establishing an increasing temperature gradient of said heating medium in said compartments in the direction of movement of said containers while maintaining a uniform pressure in all said compartments, and independently operable means to lower the temperature in the first compartment at the entry end of said chamber.

14. Apparatus according to claim 13 wherein said last mentioned means comprises a conduit arranged to automatically inject cold water into said first compartment upon rise of the heating medium temperature in said first compartment beyond a predetermined upper limit.

15. A method of processing food products in sealed cans within a confined heat treating region divided into a plurality of communicating zones, comprising the steps of establishing a heating medium mixture of steam and air under a predetermined uniform pressure in said zones, heating the cans by advancing them through successive zones of said region, and maintaining progressively increasing temperatures of the heating medium in said zones in the direction of can travel therethrough while maintaining said uniform pressure of the mixture throughout said zones.

PAUL C. WILBUR.

REFERENCES CITED

The following references are of record in the file of this patent:

UNITED STATES PATENTS

| Number | Name | Date |
| --- | --- | --- |
| 342,412 | Wicks | May 25, 1886 |
| 1,499,038 | Thompson | June 24, 1924 |
| 1,721,751 | Thompson | July 23, 1929 |
| 2,043,310 | Thompson | June 9, 1936 |
| 2,051,391 | Raney | Aug. 18, 1936 |
| 2,056,526 | Kennedy | Oct. 6, 1936 |
| 2,144,334 | Kennedy | Jan. 17, 1939 |
| 2,153,542 | Ball | Apr. 11, 1939 |
| 2,292,887 | McBean | Aug. 11, 1942 |
| 2,312,114 | Mills | Feb. 23, 1943 |
| 2,328,751 | Snyder et al. | Sept. 7, 1943 |
| 2,372,239 | Whitaker et al. | Mar. 27, 1945 |
| 2,388,103 | Whitaker et al. | Oct. 30, 1945 |